United States Patent
Miki et al.

(10) Patent No.: US 8,005,586 B2
(45) Date of Patent: Aug. 23, 2011

(54) ELECTRIC GOLF CART

(75) Inventors: Masayuki Miki, Shizuoka-ken (JP); Satoshi Yamamoto, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 754 days.

(21) Appl. No.: 11/971,798

(22) Filed: Jan. 9, 2008

(65) Prior Publication Data

US 2008/0183347 A1    Jul. 31, 2008

(30) Foreign Application Priority Data

Jan. 10, 2007   (JP) ................. 2007-001946

(51) Int. Cl.
*G06F 17/00* (2006.01)
(52) U.S. Cl. ............. 701/22; 701/1; 320/116; 320/118; 320/127; 320/132; 320/136
(58) Field of Classification Search .................. None
See application file for complete search history.

(56) References Cited

U.S. PATENT DOCUMENTS

| | | | | |
|---|---|---|---|---|
| 5,539,399 | A * | 7/1996 | Takahira et al. | 340/995.27 |
| 5,583,416 | A * | 12/1996 | Klang | 320/160 |
| 5,598,087 | A * | 1/1997 | Hara | 324/431 |
| D378,500 | S * | 3/1997 | Nakai et al. | D10/125 |
| 5,658,682 | A * | 8/1997 | Usuda et al. | 429/92 |
| 5,815,824 | A * | 9/1998 | Saga et al. | 701/22 |
| 5,892,346 | A * | 4/1999 | Moroto et al. | 318/587 |
| 6,230,081 | B1 * | 5/2001 | Albertshofer | 701/1 |
| 6,232,746 | B1 * | 5/2001 | Yamanashi | 320/132 |
| 6,465,986 | B1 * | 10/2002 | Haba | 320/116 |
| 6,735,536 | B2 * | 5/2004 | Rider | 702/63 |
| 6,793,027 | B1 * | 9/2004 | Yamada et al. | 180/65.1 |
| 6,813,526 | B1 * | 11/2004 | Dodd, Jr. | 700/65 |
| 7,489,106 | B1 * | 2/2009 | Tikhonov | 320/116 |
| 2002/0116140 | A1 * | 8/2002 | Rider | 702/63 |
| 2004/0230376 | A1 * | 11/2004 | Ichikawa et al. | 702/2 |
| 2006/0009888 | A1 * | 1/2006 | Atsumi | 701/22 |
| 2006/0238167 | A1 * | 10/2006 | Arai et al. | 320/132 |
| 2007/0210742 | A1 * | 9/2007 | Brecht | 320/104 |
| 2008/0180064 | A1 * | 7/2008 | Miki et al. | 320/136 |

FOREIGN PATENT DOCUMENTS

JP       2001-259098       9/2001

* cited by examiner

*Primary Examiner* — Khoi Tran
*Assistant Examiner* — Jonathan L Sample
(74) *Attorney, Agent, or Firm* — Keating & Bennett, LLP

(57) ABSTRACT

An electric golf cart that repeatedly travels around a given course of golf links is powered by a driving motor supplied with electric power from a driving battery. The electric golf cart is provided with a travel distance integrating unit, a memory, a battery charge and discharge integrating unit, and a discharge-per-course calculating unit. Mapping data is stored in the memory, which mapping data defines the relationship between the distance that the electric golf cart travels and the number of rounds that the electric golf cart has traveled. The number of rounds that the electric golf cart has traveled is calculated by the discharge-per-course calculating unit based on the travel distance obtained by the travel distance integrating unit along with the mapping data. Then, the number of rounds obtained and the discharge calculated by the battery charge and discharge integrating unit are utilized to identify the discharge of the driving battery per course.

4 Claims, 6 Drawing Sheets

ELECTRIC GOLF CART

CROSS-REFERENCE TO RELATED APPLICATIONS

This application claims the priority benefit of Japanese Patent Application No. 2007-001946, which was filed on Jan. 10, 2007 and which is hereby incorporated by reference in its entirety.

BACKGROUND OF THE INVENTION

1. Field of the Invention

The present invention generally relates to an electric golf cart that repeatedly travels around a given course of golf links while being powered by a motor that receives electric power from a battery.

2. Description of the Related Art

Conventionally, various types of golf carts have been used to shuttle golfers over golf links. Some of the golf carts are equipped with an indication means that indicates the number of rounds the golf cart can still travel at any given time (See JP-A-2001-259098, for example). The number of rounds the golf cart still can travel indicated on this type of golf cart is a value obtained by dividing the remaining fuel available to the engine by the fuel consumption for the golf cart to travel one round of a golf course. On this type of golf cart, other operations are carried out such as obtaining the fuel consumption per round by measuring the fuel consumption every time the golf cart travels one round on a golf course. In order to determine when one round of golf begins and ends, magnets can be positioned at prescribed locations along the course to mark the start and the end of travel distance for one-round and then detecting these magnets with a sensor mounted on the golf cart.

SUMMARY OF THE INVENTION

The conventional golf cart described above is driven by an internal combustion engine, and the number of rounds the golf cart still can travel is calculated based on the amount of fuel remaining that is available to the engine. However, this method of calculating the number of rounds the golf cart can still travel cannot be applied to electric golf carts. Therefore, the problem for the electric golf cart is how to obtain the battery discharge per round such that one can then calculate the number of rounds the golf cart can still travel. In addition, the conventional golf cart described above results in additional equipment cost because the travel end of one-round is determined by detecting the magnet with the sensor mounted on the golf cart, which magnet is disposed along the path over which the golf cart operates.

Certain features, aspects and advantages of the present invention have been designed to deal with the issue mentioned above, and it is, therefore, an object of some embodiments of the present invention to provide an electric golf cart that is able to calculate the battery discharge over one round of a golf course.

Thus, some embodiments that are arranged and configured in accordance with certain features, aspects and advantages of the present invention may comprise an electric golf cart that is adapted for use on a course of golf links. The electric golf cart may be powered by a motor that is supplied with electric power from a battery. The electric golf cart can comprise a travel distance calculator that is adapted to calculate a travel distance over which the electric golf cart has traveled. The electric golf cart also can comprise memory adapted to store pre-generated mapping data defining a relationship between the travel distance of the electric golf cart and a number of rounds that the electric golf cart has traveled. The electric golf cart further may comprise a discharge calculating component that is adapted to calculate a battery discharge. The electric golf cart can comprise a discharge-per-unit-round calculator that is adapted to calculate a discharge-per-round of the battery based on the battery discharge obtained by the discharge calculator and a number of rounds the electric golf cart has traveled, which is calculated based on the travel distance obtained by the travel distance calculator and the pre-generated mapping data.

In some embodiments, the electric golf cart includes a notifying system that calculates, using the discharge calculator, a discharge over a period from a state where the battery has charged to its maximum capacity to another state where the remaining capacity of the battery reaches a predetermined threshold, and which, when the calculated discharge has become equal to or less than a discharge required for the electric golf cart to travel through a given number of rounds, makes a notification to such effect. Setting the threshold in this way allow one to check of the level of battery deterioration over time. In other words, deterioration of the battery can be identified by the fact that, in the brand-new condition, the electric golf cart was able to travel through a given number of rounds before the remaining battery capacity reached the threshold once the battery had been charged to the maximum battery capacity (full charge battery capacity); however, the current remaining battery capacity reaches the threshold before the electric golf cart has traveled through the given number of rounds. The threshold can be set at different values as desired. Thus, the deteriorating condition of the battery can be checked based upon customized information relating to the usage of the electric golf cart in any particular golf links.

BRIEF DESCRIPTION OF THE DRAWINGS

These and other features, aspects and advantages of certain embodiments of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
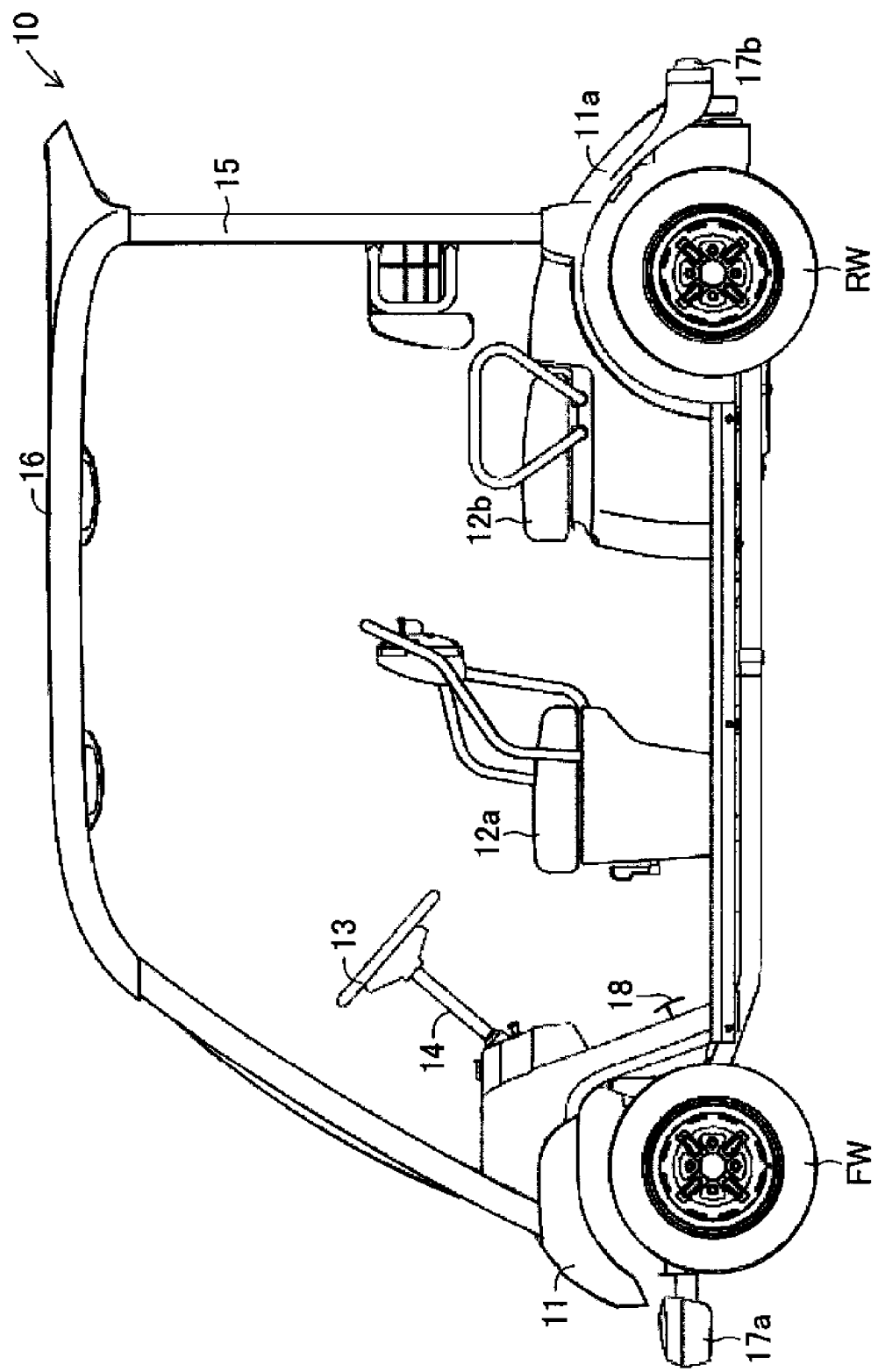
FIG. 1 is a side view of an electric golf cart that is arranged and configured according certain features, aspects and advantages of an embodiment of the present invention.

Now, an embodiment of the present invention will be described in detail below with reference to the drawings. FIG. 1 shows an electric golf cart 10 that is arranged and configured in accordance with certain features, aspects and advantages of an embodiment of the present invention. The electric golf cart 10 has a pair of front wheels FW (only one is shown) provided respectively on each lateral side of a lower part of a vehicle body 11 toward the front. The electric golf cart 10 also has a pair of rear wheels RW (only one is shown) provided respectively on each lateral side of the lower part of the vehicle body 11 toward the rear. The electric golf cart 10 is also provided with a front seat 12a for accommodating two persons and a rear seat 12b for accommodating three persons disposed in parallel in the center of the interior of the vehicle body 11. A steering wheel 13 mounts to a steering shaft 14, which is located in front of the driver's seat of a front seat 12a, which also is located in the forward part of the vehicle body 11.

A roof 16 over at least a portion of the vehicle body 11. A support frame 15 carries the roof 16 and the support frame 15 in the illustrated configuration extends downward toward the four corners of the vehicle body 11. The lower front end of the vehicle body 11 carries a bumper 17a while the lower rear end of a cowl 11a, which defines a rear portion of the illustrated vehicle body 11, carries a bumper 17b.

The electric golf cart 10 preferably can be operated either manually or automatically. During manual operation, the operator sitting on the front seat 12a turns the steering wheel 13 to change the direction of the front wheels FW to the left or to the right, which makes the electric golf cart 10 turn left or right.

Figure 2:
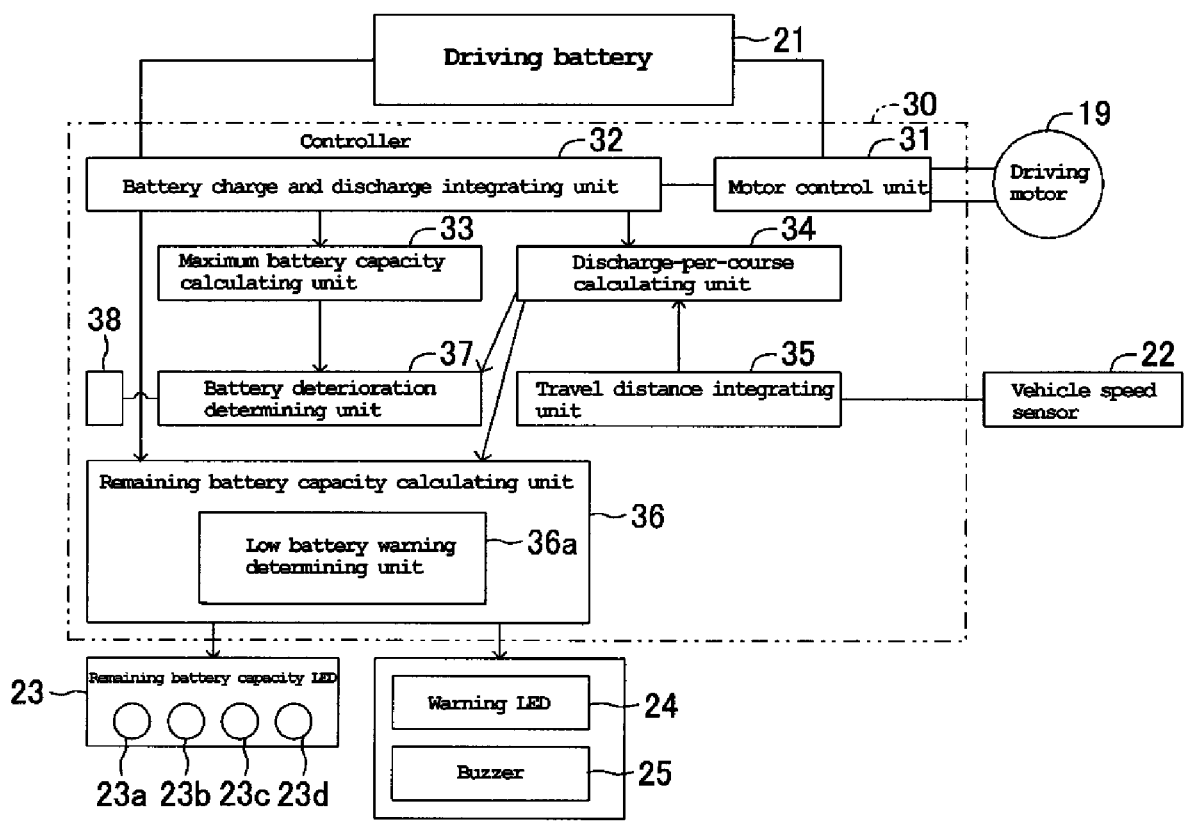
FIG. 2 is a block diagram of a controller used in the golf cart of FIG. 1 and various devices that can be connected to the controller.

During automatic operation, a controller 30, shown in FIG. 2, takes control, and the controller 30 disconnects the lower part of the steering shaft 14 from the upper part of the steering shaft 14, actuates a steering motor (not shown) provided in the lower part of the steering shaft 14 to turn the lower part of the steering shaft 14, and makes the front wheels FW turn to the right or to the left according to the rotational movement of the lower part of the steering shaft 14.

An accelerator pedal (not shown) and a brake pedal 18 preferably are provided side by side below the steering wheel 13 in the front part of the vehicle body 11. The rear part of the vehicle body 11 carries a driving motor 19 (refer to FIG. 2) that is used to drive the rear wheels RW. The rear part of the vehicle body 11 also can carry other components.

The accelerator pedal and the brake pedal 18 are used by the operator while the electric golf cart 10 is traveling under the control of the operator. The accelerator pedal is connected to the controller 30 such that, as the operator steps on the accelerator pedal, the driving motor 19 operates in accordance with the degree to which the accelerator pedal is depressed downward. Thus, with greater actuation of the accelerator pedal, the speed of the electric golf cart 10 increases. While the electric golf cart 10 is in automatic operation, the driving motor 19 is operated by the controller 30.

The brake pedal 18 is connected to a disc brake provided on the front wheels FW and the rear wheels RW respectively by way of a hydraulic disc brake system (not shown). The brake pedal 18 also is connected to the controller 30 by a brake motor (not shown). As the operator steps on the brake pedal 18, the hydraulic disc brake system communicates to the disk brake the degree to which the brake pedal 18 is depressed and the disk brake is actuated slow the rotational action of the front wheels FW and the rear wheels RW.

While the electric golf cart 10 is in automatic operation, the brake motor is activated by the controller 30 such that the brake motor actuates the disk brake to slow the rotational movement of the front wheels FW and the rear wheels RW. In some embodiments, the brake motor causes the brake pedal 18 to move and the movement of the brake pedal 18, or a component coupled thereto, causes the hydraulic disc brake system to communicate to the disc brake the degree to which the electric golf cart 10 should be slowed.

As shown in FIG. 2, the electric golf cart 10 comprises, besides the controller 30, a driving battery 21, which itself comprises a lead acid battery, a vehicle speed sensor 22 that detects the traveling speed of the electric golf cart 10, a remaining battery capacity LED 23 that displays the available charge in the driving battery 21, which can be one form of an indication mechanism, a warning LED 24 that displays that the available charge in the driving battery 21 has dropped below the predetermined threshold into the abnormal level, and a buzzer 25 that emits a warning once the available charge in the driving battery 21 has dropped below the predetermined threshold into the abnormal level. The driving battery 21 delivers electric power to the driving motor 19 to actuate the driving motor 19 via a motor control unit 31 of the controller 30. The controller 30 and the driving battery 21 can be disposed generally below, or can be contained inside of, the front seat 12a of the vehicle body 11.

The controller 30 also comprises a battery charge and discharge integrating unit 32. The battery charge and discharge integrating unit 32 calculates the state of battery charge and discharge based on the voltage and amperage of the driving battery 21. The controller further comprises a maximum battery capacity calculating unit 33, a discharge-per-course calculating unit 34, a travel distance integrating unit 35, a remaining battery capacity calculating unit 36, a battery deterioration determining unit 37, and an interface 38 that connects the battery deterioration determining unit 37 to an external monitoring device. Although not shown, the controller 30 also can have a memory that acts as a storage area, with the memory preferably comprising a ROM and a RAM. The memory can store a program, which will be described later, mapping data, and so on. The memory also can store various types of data in the rewritable condition.

Figure 3:
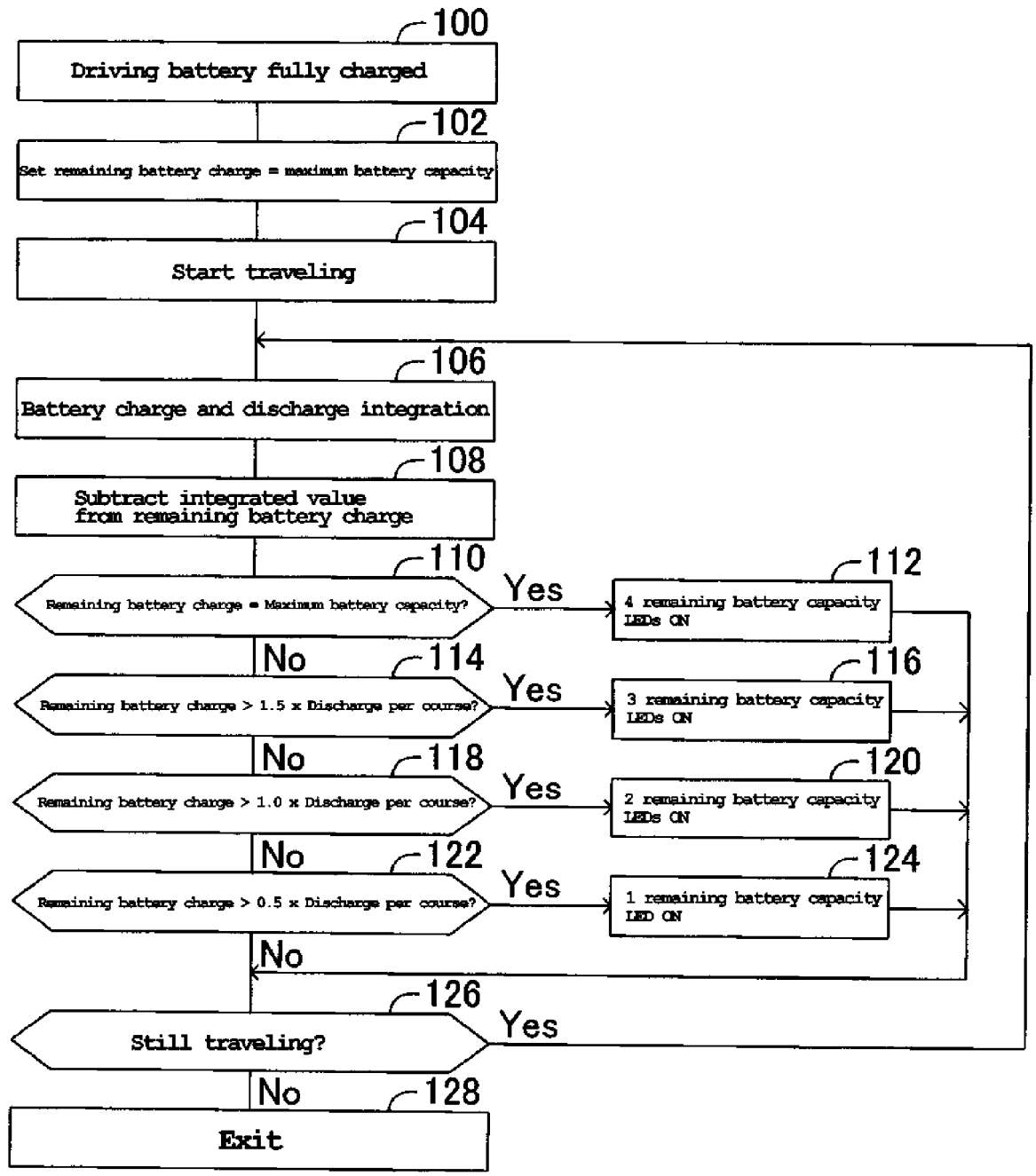
FIG. 3 is a flowchart showing a program used to carry out an indication by a remaining battery capacity LED.
Figure 4:
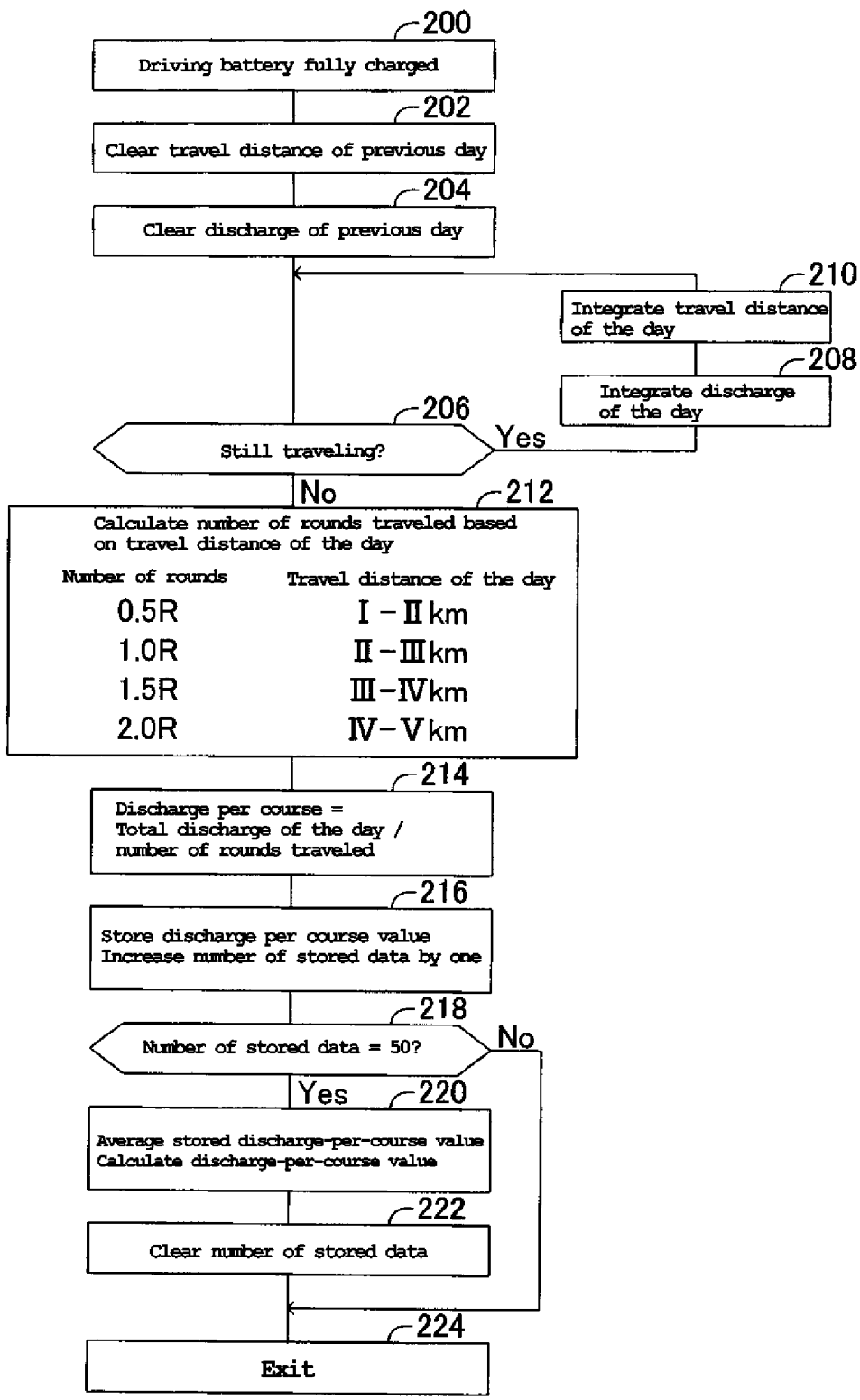
FIG. 4 is a flowchart showing a program used to obtain the battery discharge per course round trip.
Figure 5:
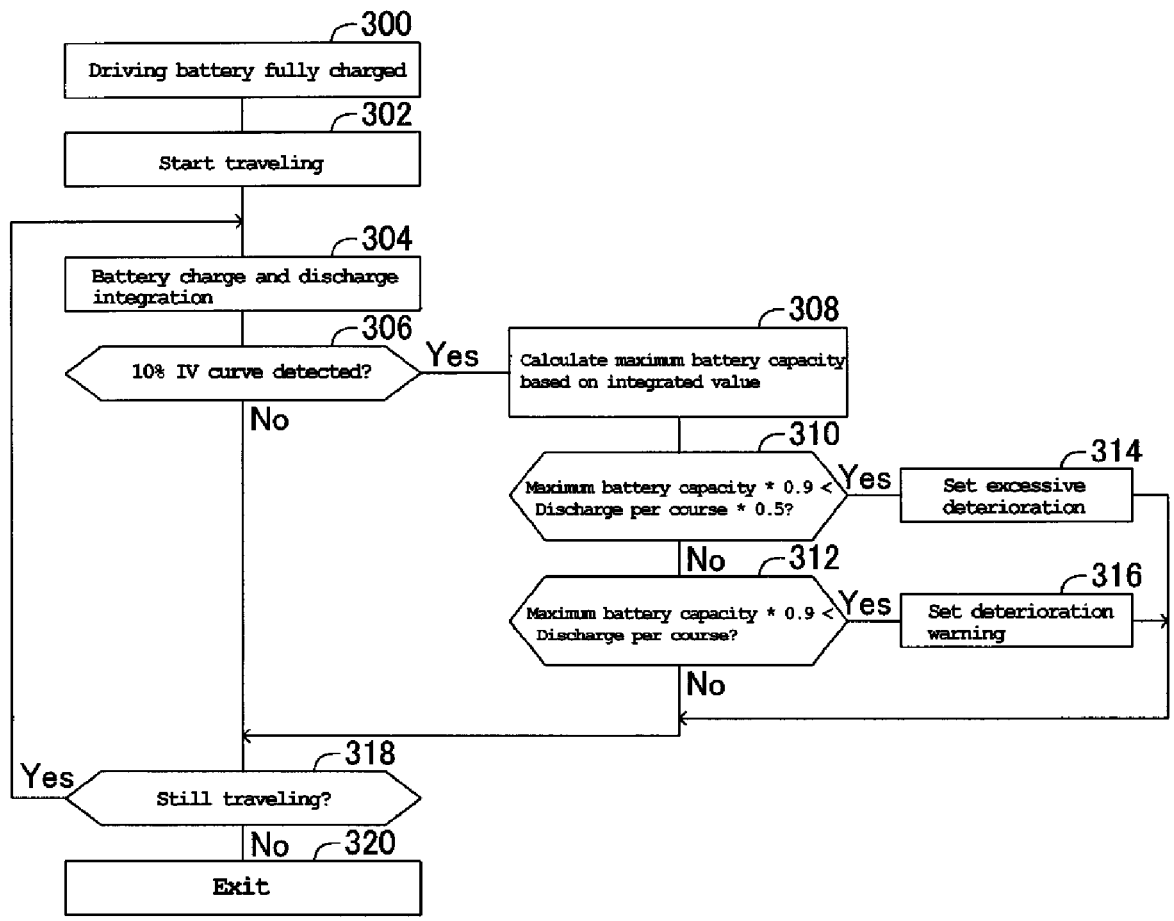
FIG. 5 is a flowchart showing a program used to detect a deteriorating driving battery.
Figure 6:
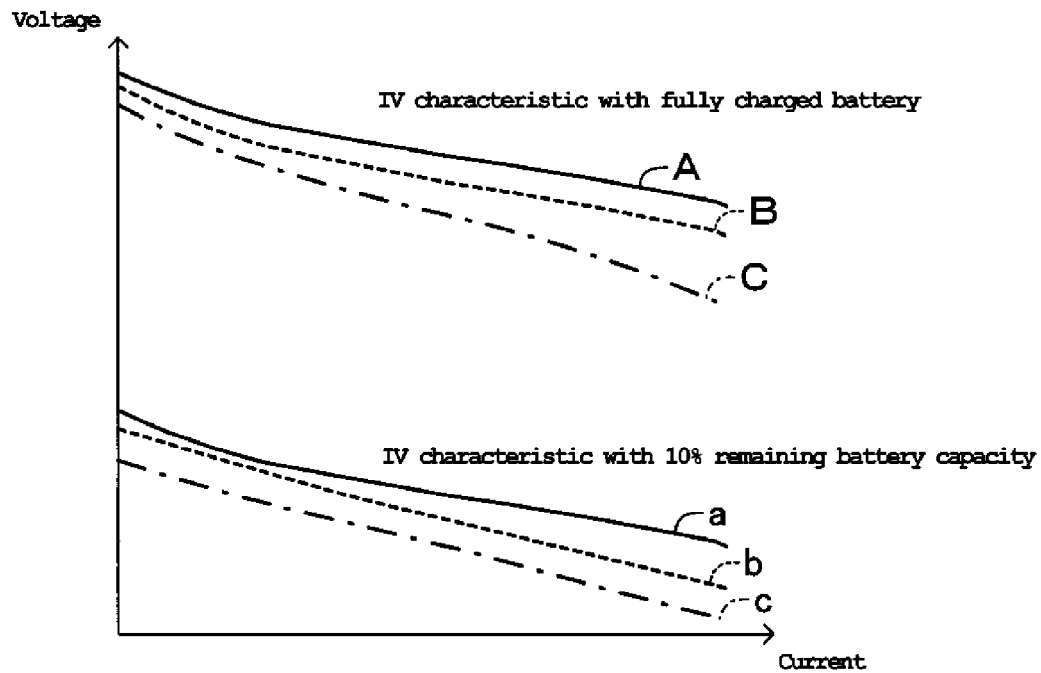
FIG. 6 is a chart showing IV characteristics of an exemplary driving battery.

In some embodiments, the ROM stores the program shown in FIGS. 3 through 5, mapping data such as that shown in FIG. 6, and so on, while the RAM stores various data transmitted by each device, such as the battery charge and discharge integrating unit 32, the maximum battery capacity calculating unit 33, the discharge-per-course calculating unit 34 and so on, with each data being sequentially re-written to the newly transmitted data.

The battery charge and discharge integrating unit 32 acts as a voltage detector, an amperage detector, and a battery discharge calculator. The battery charge and discharge integrating unit 32 detects the voltage and amperage values of the driving battery 21, preferably periodically at short intervals, and calculates the battery charge and discharge to transmit the calculated battery charge and discharge to the maximum battery capacity calculating unit 33 and to the discharge-per-course calculating unit 34 in the form of a detected signal or value. Namely, the battery charge and discharge integrating unit 32 preferably comprises a voltage detecting device, an amperage detecting device, and a battery discharge integrator.

The maximum battery capacity calculating unit 33 calculates the maximum capacity (i.e., the full-charge battery capacity) of the driving battery 21 based upon the voltage, the amperage, and the battery charge and discharge data transmitted by or from the battery charge and discharge integrating unit 32, as well as mapping data stored in memory. The travel distance integrating unit 35 preferably defines a travel distance calculator. The travel distance integrating unit 35 connects to the vehicle speed sensor 22 and calculates the travel distance of the electric golf cart 10 by integrating the data signals for the traveling speed of the electric golf cart 10 transmitted by the vehicle speed sensor 22. The vehicle speed sensor 22 can be mounted in any suitable portion of the vehicle body 11.

The discharge-per-course calculating unit 34 calculates how much the driving battery 21 discharges while the electric golf cart 10 travels through a round of golf on a given golf course. In some embodiments, the calculation is based at least in part on the travel distance data of the electric golf cart 10 transmitted by the travel distance integrating unit 35 and at least in part on the battery charge and discharge data transmitted by the battery charge and discharge integrating unit 32. The remaining battery capacity calculating unit 36 preferably defines a remaining battery capacity calculating member, which calculates the remaining capacity of the driving battery 21 mainly based on the battery charge and discharge data transmitted by the battery charge and discharge integrating unit 32, as well as the discharge-per-course data transmitted by the discharge-per-course calculating unit 34.

In addition, the remaining battery capacity calculating unit 36 has a low battery warning determination unit 36a that decides if the remaining capacity of the driving battery 21 is above or below a predetermined minimum threshold. The battery deterioration determining unit 37 decides the degree of deterioration of the driving battery 21 based on the maximum capacity data for the driving battery 21 transmitted by the maximum battery capacity calculating unit 33, and the discharge-per-course data transmitted by the discharge-per-course calculating unit 34. The battery deterioration determining unit 37 described above connects to an external personal computer or the like to display the degree of deterioration of the driving battery 21 by way of the personal computer, a display device or the like.

The remaining battery capacity LED 23 is provided in the vicinity of the steering shaft 14 inside the electric golf cart 10 or at another suitable location where it is readily visible for the operator. Preferably, the remaining battery capacity LED 23 visually displays the number of rounds that the electric golf cart 10 can still travel based on the battery's remaining capacity obtained by the calculation performed by the remaining battery capacity calculating unit 36. In the illustrated configuration, the remaining battery capacity LED 23 has lamps 23a, 23b, 23c and 23d made up of four LED's. The remaining battery capacity LED 23 turns on and off the lamps 23a, 23b, 23c and 23d sequentially according to the remaining capacity value of the driving battery 21 calculated by the remaining battery capacity calculating unit 36.

In this process, all the lamps 23a, 23b, 23c and 23d come on when the remaining capacity in the battery is close to the level of a fully-charged driving battery 21. Then, as the remaining capacity is reduced slightly, the lamp 23a goes off while the rest of the lamps 23b, 23c and 23d are kept on. When the remaining capacity is reduced further, the lamp 23b goes off while other lamps 23c and 23d are kept on. When the remaining capacity is reduced even further, the lamp 23c goes off. In this way, as the remaining capacity is reduced, the lamps are turned off in the order starting from the lamp 23a to the lamp 23d. Other types of displays also can be used.

In some embodiments, the warning LED 24 also is made up of an LED lamp. Other types of displays can be used; however, the LED construction advantageously is simple to construct and draws low levels of energy during use. The warning LED 24 preferably is provided in the vicinity of the steering shaft 14 inside the electric golf cart 10 or at another suitable site where it is readily visible to the operator. The warning LED 24 flashes when a determination is made by the low battery warning determination unit 36a that the remaining capacity of the driving battery 32 is below the predetermined threshold. Thus, the warning LED 24 visually notifies operators or users of the need to recharge the driving battery 21. A buzzer 25 also emits a warning sound for acoustically or audibly notifying operators or users of the need to recharge the driving battery 21. Other types of operator notification devices can be used to draw the operator's attention to the need to recharge the driving battery. The operator notification devices can be visual (e.g., lights), auditory (e.g., buzzers or bells) or tactile (e.g., vibratory), for example but without limitation.

The controller 30 preferably has a CPU (not shown) that serves as the controller and performs any desired control functions on behalf of the controller 30. Various arithmetic processes for actuating the devices contained in the controller 30 are carried out by the CPU. Further, besides the programs and mapping data described above, various programs and mapping data for starting, running and stopping the electric golf cart 10 can be stored in memory. The memory temporarily stores various data, including the traveling speed detection signals transmitted by the vehicle speed sensor 22 that is installed on the vehicle body 11 of the electric golf cart 20, while the CPU of the controller 30 carries out the desired processes and calculations by using the programs and mapping data stored in the memory as well as various detected data. Thus, the CPU portion of the controller 30 makes the electric golf cart 10 start, run, or stop through its interactions with the motor control unit 31.

To operate the above-described electric golf cart 10, the operator first sits on the front seat 12a behind the steering wheel 13. Next, the operator turns on switches (not shown), including a power switch, and steps on the accelerator pedal. The driving motor 10 is actuated by this, and the electric golf cart 10 starts to move. After the power switch is turned on, the remaining capacity of the driving battery 21 is indicated on the remaining battery capacity LED 23 by the corresponding number of rounds the golf cart can still travel. Thus, the operator can check the remaining battery capacity LED 23 as desired to identify the number of rounds he or she can go without recharging the battery.

The driving battery 21 of the electric golf cart 10 preferably is connected to a battery charger for recharging at night when the electric golf cart 10 is not in use. In addition, the driving battery 21 of the electric golf cart 10 preferably is charged to the maximum battery capacity (full-charge battery capacity) or to almost the maximum battery capacity when the electric golf cart 10 is first operated on the next day of use. Further, the maximum battery capacity of the driving battery 21 can be updated and stored in memory every time the remaining battery capacity falls to the predetermined threshold. This enables the maximum battery capacity setting in accordance with the current condition of the driving battery 21 regardless of the progressive deterioration of the driving battery 21 resulting from usage.

With reference now to FIG. 3, indication by the remaining battery capacity LED 23 preferably is carried out while the electric golf cart 10 is in operation. The program shown by the flowchart in FIG. 3 can be carried out periodically (e.g., at short time intervals) by the CPU of the controller 30 after the driving battery 21 is fully recharged. Referring to the flowchart in FIG. 3, the program preferably starts after the driving battery 21 is fully charged (see 100). Then, the maximum battery capacity data currently stored in memory is read to set the data value as the remaining battery charge (see 102). The value of the maximum battery capacity stored in memory is the value that has been obtained by executing the program shown in FIG. 5, for example, which will be described later, and has been stored in memory. To obtain the value, the discharge of the driving battery 21 from the fully charged state to 10% of the full-charge battery capacity (the threshold) is divided by 0.9, for instance.

Next, the electric golf cart 10 starts traveling, which begins the discharge of the driving battery 21 (see 104). Then, the battery charge and discharge integrating unit 32 starts integration of charge and discharge (see 106). The battery charge and discharge value is obtained by sequentially integrating the charging and discharging current of the driving battery 21 using the discharge integrator included in the battery charge and discharge integrating unit 32, for instance. The obtained value of battery charge and discharge is temporarily stored in memory. Next, the current remaining battery capacity is obtained by subtracting the determined battery charge and discharge value from the remaining capacity of the driving battery 21 (see 108). This process preferably is carried out with the remaining battery capacity calculating unit 36.

Then, it is determined whether the remaining battery capacity is equal to the maximum battery capacity or not (see 110). The determination is made by judging if the remaining battery capacity obtained (e.g., using 108) equals the initial remaining battery capacity (i.e., the maximum battery capacity) or not. It is determined "YES" if the remaining battery capacity obtained (e.g., using 108) is equal to the maximum battery capacity, which leads the program to 112. In 112, all of the lamps 23a, 23b, 23c, 23d of the remaining battery capacity LED 23 are illuminated based on the calculation result by the remaining battery capacity calculating unit 36. Next, a determination is made if the electric golf cart 10 is still running (e.g., if the driving battery 21 is still discharging) (see 126). If the traveling action of the electric golf cart 10 already has been terminated at this time, the program exits (see 128).

Then, the driving battery 21 is connected to the battery charger when the electric golf cart 10 is not in use, and the driving battery 21 is recharged to the maximum battery capacity described above. Thus, the aforementioned process is carried out all over again during the next use of the electric golf cart 10. If it is determined "YES" (see 126) that the electric golf cart is still traveling (e.g., because the electric golf cart 10 is still operating), then the program proceeds to 106 and 106-108 are carried out. After this, the determination is made if the remaining capacity of the driving battery 21 is equal to the maximum battery capacity or not (see 110).

On the contrary, if it is determined "NO" because the remaining battery capacity obtained (see 108) is less than the maximum battery capacity, then the program proceeds to judge if the remaining capacity of the driving battery 21 is larger than 1.5 times the discharge by the driving battery 21 while the electric golf cart 10 travels through a round of a given golf course (see 114). Hereinafter the battery discharge corresponding to the traveling of one round of golf on a given golf course shall be referred to as a discharge per course. The discharge per course is a predetermined value obtained by the running program shown in FIG. 4, for example, and is updated appropriately according to the day-to-day operating conditions of the electric golf cart 10.

The program represented by the flowchart of FIG. 4 is periodically executed by the CPU of the controller 30 after the driving battery 21 is fully charged. The program preferably begins when the charging of the driving battery 21 has been completed (see 200). Then, the travel distance data of the previous day is cleared, which travel distance data was calculated by the travel distance integrating unit 35 and was stored in the memory (see 202). Next, the discharge data of the previous day is cleared, which discharge data was calculated by the battery charge and discharge integrating unit 32 and was stored in the memory (see 204).

A determination then is made if the electric golf cart 10 is still running or not (see 206). If the traveling action of the electric golf cart 10 has already been terminated at this point of time, the program proceeds to 212. On the other hand, if the electric golf cart 10 is still running, it is determined "YES" and the integration process for the battery discharge is carried out with the battery charge and discharge integrating unit 32, for example (see 208). Next, the integration process for the travel distance is carried out with the travel distance integrating unit 35, for instance (see 210). The loop in continued until the "still traveling" state of the electric golf cart 10 is terminated, which results in the judgment of "NO" (see 206). Thus, in some embodiments, the battery discharge and the travel distance are continuously integrated.

Unless otherwise noted, as used herein, "still running" in the context of this program refers to the time frame beginning when the electric golf cart starts to move and ending when the electric golf cart 10 stops moving. Once the electric golf cart 10 has stopped, the number of rounds traveled is calculated, based on mapping data created in advance. The number of rounds is set up in advance in mapping data in relation to the travel distance of the day. The number of rounds is obtained by comparing the travel distance identified (see 210) with this mapping data. Each of the characters "I" through "V" in the mapping data represents a certain travel distance in km (kilometers), for example, among which "I" is the shortest distance followed by a longer distance toward "V". Subsequently, the discharge per course is obtained (see 214) by dividing the discharge of the day identified (see 208) by the number of rounds traveled (see 212).

Next, the discharge-per-course value (see 214) is temporarily stored in the memory and, at the same time, the number of stored data for the discharge per course is stored (see 216). Then, the determination is made if the number of stored data has reached 50 or not (see 218). If the number of stored data is less than 50, the program proceeds to 224 and is terminated for the time being. Then, after the driving battery 21 is recharged, the program is restarted from 200, and the processes of 202 through 218 and 224 will be repeated until the number of stored data reaches 50.

Once the number of stored data reaches 50, resulting in the judgment of "YES" at 218, then the program proceeds to average the 50 pieces of discharge-per-course data (see 220). The averaging helps to take into account that the exact distance traveled during any one round of golf will vary from other rounds of golf. Next, the program clears the number of stored data 50 (see 222) and then exits (see 224). The obtained discharge-per-course value (see 220) is temporarily stored in memory. The value is updated with the new value when the average of the next 50 discharge-per-course data is calculated.

At 114 of the aforementioned program in FIG. 3, the determination is made if the remaining capacity of the driving battery 21 is larger than 1.5 times the discharge-per-course value or not, applying the discharge-per-course value, which can be obtained by executing the program shown in FIG. 4 in the way described above. If the remaining capacity of the driving battery 21 is larger than 1.5 times the discharge-per-course value, it is determined "YES" and the program proceeds to 116. The lamp 23a of the remaining battery capacity LED 23 can be turned off, while the other lamps 23b, 23c, 23d are kept on (see 116). Subsequently, the program determines if the electric golf cart 10 is still running or not (see 126).

If the determination is "YES" (see 126) because the electric golf cart 10 is still running, the program beings to loop through 106-126 until the "still traveling" state of the electric golf cart 10 ends. The remaining capacity of the driving battery 21 is checked to determine if it is larger than the discharge-per-course value or not (see 118). If the remaining capacity of the driving battery 21 is larger than the discharge-per-course value, the lamp 23b is turned off while the lamps 23c, 23d remain on (see 120). If the remaining capacity of the driving battery 21 is less than the discharge-per-course value, then the program proceeds to 122.

The remaining capacity of the driving battery 21 is checked to see if it is larger than half the discharge-per-course value or not (see 122). If the remaining capacity of the driving battery 21 is larger than half the discharge-per-course value, the lamp 23c is turned off while the lamp 23d is remains on (see 124). If the remaining capacity of the driving battery 21 is less than half the discharge-per-course value, then the program proceeds to 126. If the traveling action of the electric golf cart 10 has already ended (see 126), the program exits (see 128). Then, the driving battery 21 preferably is recharged to the maximum battery capacity as described above.

On the other hand, if the electric golf cart 10 is still moving and the electric golf cart 10 continues traveling until the remaining capacity of the driving battery 21 drops to an abnormal level, the warning LED 24 starts flashing and the buzzer 25 emits a warning sound, for example. Thus, the operator receives notice that the remaining capacity of the driving battery 21 has dropped to the level that the battery needs immediate recharging. The driving battery 21 then can be connected to the battery charger for recharging while the electric golf cart 10 is not in use. Thus, the driving battery 21 will be charged to the maximum battery capacity (full-charge battery capacity) or close to the maximum battery capacity when the electric golf cart 10 is first operated on the next day of use. Consequently, the driving battery 21 is in the appropriately recharged condition on the next operating day, and the processes described above can be executed again. It should be noted that the programs shown in FIGS. 3 and 4 are executed simultaneously. Once the discharge-per-course value is updated in the program of FIG. 4, the updated discharge-per-course value can be used in the program shown in FIG. 3.

A calculating process for determining the maximum capacity of the driving battery 21 will be described in the following section referring to the flowchart shown in FIG. 5. The program shown by the flowchart in FIG. 5 is carried out periodically (i.e., repeatedly at predetermined time intervals) by the CPU of the controller 30, for example, after the driving battery 21 is fully recharged. The flowchart shown in FIG. 5 is initialized (see 300) and then proceeds once the electric golf cart 10 starts running (see 302). The program integrates the battery charge and discharge by use of the battery charge and discharge integrating unit 32, for example (304).

Then, the program determines if the remaining capacity of the driving battery 21 has reached 10% of the IV curve or not (see 306). In some embodiments, this process is carried out based on mapping data such as that shown in FIG. 6, which can be stored in memory. FIG. 6 shows IV characteristics (e.g., current-voltage characteristics) of the driving battery 21. The solid line "A" in the upper part of FIG. 6 represents the characteristics when the driving battery 21 (of which maximum battery capacity is 60 Ah, for instance) is charged to the full level while being new. The broken line "B" represents the characteristics when the driving battery 21 (of which maximum battery capacity is 30 Ah, for instance) is charged to the full level with some deterioration of the driving battery 21, and the dash and dot line "C" represents the characteristics when the driving battery 21 (of which maximum battery capacity is 20 Ah, for instance) is charged to the full level with further deterioration of the driving battery 21.

In addition, the solid line "a" in the lower part of FIG. 6 is the 10% IV curve of the new driving battery 21, the broken line "b" is the 10% IV curve of the driving battery 21 with some deterioration, and the dash and dot line "c" is the 10% IV curve of the driving battery with further deterioration. For clarity, the horizontal axis of FIG. 6 represents the current value while the vertical axis represents the voltage value. In other words, it is indicated that this particular driving battery 21 should be recharged as soon as the remaining battery capacity has dropped to about 10% of the full-charge battery capacity. FIG. 6 also indicates that the voltage decreases as the current increases with the relationship being more prominent as the drive battery deteriorates through use.

Thus, when the driving battery 21 is brand-new and fully charged, for instance, the position on the line "A" moves depending on the variation in current and voltage associated with the operating conditions of the electric golf cart 10. As the remaining capacity of the driving battery 21 decreases due to the operation of the electric golf cart 10, the IV characteristics of the driving battery 21 represented by the solid line "A" changes toward the solid line "a". During operation, the process is carried out based on mapping data, such as that shown in FIG. 6, to detect if the part (point) corresponding to the current and the voltage detected by the battery charge and discharge integrating unit 32 has reached the 10% IV curve associated with the condition of the driving battery 21 in question (the solid line "a" in this case) (see 306).

If the remaining capacity of the driving battery 21 has not reached the 10% IV curve, it is determined "NO", and the program determines if the electric golf cart 10 is still running or not (see 318). If the traveling action of the electric golf cart 10 has already been terminated at this time, the program proceeds to 320 and the discharge stops. Then, the driving battery 21 can be connected to the battery charger while the electric golf cart 10 is not in use and the electric golf cart 10 can be recharged to the maximum battery capacity described above. Thus, the aforementioned process can being again at the next use of the electric golf cart 10.

If it is determined "YES" (see 318) because the electric golf cat 10 is still running, then the program carries out the aforementioned operations (see 304 and 306). The processes in 304, 306, and 318 are carried out repeatedly as long as the determination in 306 is "NO" because the remaining capacity of the driving battery 21 has not reached the 10% IV curve, and the electric golf cart is still traveling. The integration of the battery charge and discharge using the battery charge and discharge integrating unit 32 continues throughout the aforementioned period.

If the remaining capacity of the driving battery 21 has reached the 10% IV curve, it is determined "YES" in 306, and the program proceeds to 308. In 308, the maximum battery capacity calculating unit 33, for example, calculates the maximum battery capacity based on the integrated discharge value obtained by, for example, the battery charge and discharge integrating unit 32. The remaining battery capacity at this point has dropped to 10% from the remaining battery capacity available with a fully charged battery (100%), which means 90% of the battery capacity has been discharged. Thus, when the calculation is performed on mapping data such as that shown in FIG. 6, for example, the current maximum battery capacity of the driving battery 21 is obtained by dividing the integrated discharge value obtained by the battery charge and discharge integrating unit 32 by 0.9. Then, the current maximum battery capacity, which can be obtained in this way, is stored in the memory as an updated maximum battery capacity.

Next, it is determined if the product of the maximum battery capacity obtained in 308 and 0.9 is smaller than the product of the discharge per course and 0.5 or not (see 310). In other words, it is determined whether or not the electric golf cart equipped with the driving battery 21 in the present condition can not travel half the round with 90% of the maximum battery capacity after the driving battery 21 is charged to the full level. If the product of the maximum battery capacity and 0.9 is larger than the product of the discharge per course and 0.5, resulting in the judgment of "NO" in FIG. 5, then the program proceeds to 312.

In 312, the determination is made if the product of the maximum battery capacity obtained in 312 and 0.9 is smaller than the discharge per course or not. In other words, it is determined whether or not the electric golf cart equipped with the driving battery 21 in the present condition can not travel one round with 90% of the maximum battery capacity after the driving battery 21 is charged to the full level. If the product of the maximum battery capacity and 0.9 is larger than the discharge per course, resulting in the judgment of "NO" in FIG. 5, then the program proceeds to 318 to determine if the electric golf cart 10 is still traveling or not.

The processes in 304 through 312 and 318 preferably are carried out repeatedly as long as the electric golf cart 10 is still running and as long as the product of the maximum battery capacity and 0.9 is larger than the discharge per course. The integration of the battery charge and discharge by way of the battery charge and discharge integrating unit 32 continues throughout the aforementioned period and the maximum battery capacity obtained by the maximum battery capacity calculating unit 33 can be continually updated. Once the product of the maximum battery capacity and 0.9 becomes smaller than the discharge per course, it is determined "YES" in 312 and the program proceeds to 316. In 316, the deterioration warning is activated. The deterioration warning can be activated by the battery deterioration determining unit 37. The deteriorating condition of the driving battery 21 can be checked by, for example, an external personal computer or the like that is connected to the battery deterioration determining unit 37 via an interface 38. Checking of the deteriorating condition of the driving battery 21 can be performed in any manner and as soon as desired.

Next, the program proceeds to 318, in which it is determined if the electric golf cart 10 is still traveling or not. Once the product of the maximum battery capacity and 0.9 becomes smaller than the product of the discharge per course and 0.5, it is determined "YES" in 310 and the program proceeds to 314. Deterioration failure is indicated under such conditions (see 314). The deterioration failure is set using the battery deterioration determining unit 37, preferably in the same way as the deterioration warning described above. The deteriorating condition can be checked using an external personal computer or the like that is connected to the battery deterioration determining unit 37 via the interface 38.

In this way, when the deterioration of the driving battery 21 has resulted in the reduction of the maximum battery capacity to 30 Ah in comparison with 60 Ah in the brand-new condition, for example, the broken lines "B", "b" among the IV characteristic lines on mapping data such as that shown in FIG. 6 are applied to execute the program shown in FIG. 5. When the maximum battery capacity has reduced to 20 Ah, the dash and dot line "C", "c" among the IV characteristic lines on mapping data such as that shown in FIG. 6 are applied to execute the program shown in FIG. 5. In such cases, the time for the remaining capacity of the driving battery 21 to reach the 10% IV curve becomes progressively shorter compared to the brand-new condition, but how the remaining battery capacity decreases is generally the same as that in the brand-new condition. Thus, the description in this regard will be omitted.

Figure 7:
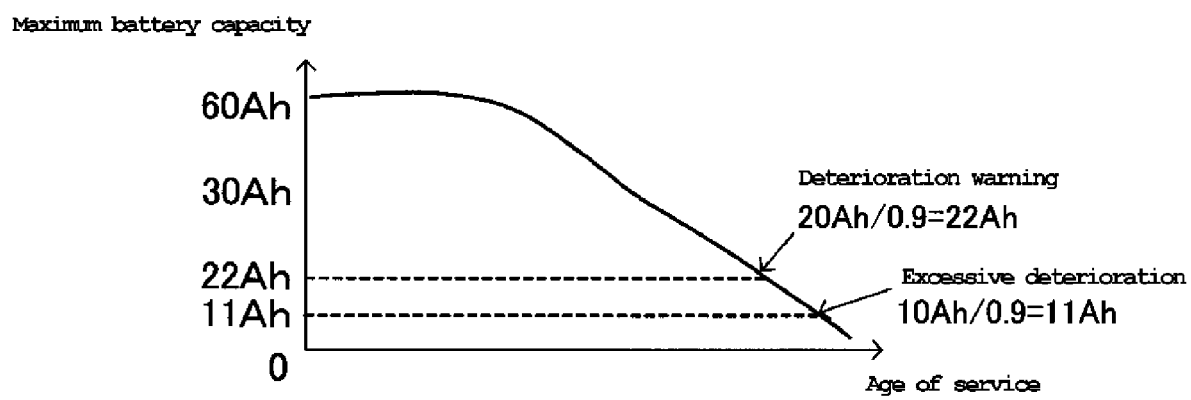
FIG. 7 is a chart showing a relation between a maximum capacity and a service life of the driving battery.

FIG. 7 shows an example of the relationship between the maximum capacity and the age of service of the driving battery 21. The maximum capacity of the driving battery 21 is maintained generally the same as that in the brand-new condition for a given number of years; however, it reduces generally in proportion to the age of service after the given number of years has elapsed. The deterioration warning setting in 314 of the flowchart shown in FIG. 5 is to be carried out when the maximum battery capacity in FIG. 7 is reduced to 22 Ah, for instance. In this case, the discharge capacity before the remaining capacity of the driving battery 21 reaches 10% IV curve is 20 Ah. Thus, the electric golf cart 10 can travel one round of a golf course when the discharge per course for the particular golf course is less than 20 Ah.

The deterioration failure setting in 316 of the flowchart shown in FIG. 5 is to be carried out when the maximum battery capacity in FIG. 7 is reduced to 11 Ah, for instance. In this case, the discharge capacity before the remaining capacity of the driving battery 21 reaches 10% IV curve is 10 Ah. Thus, the electric golf cart 10 can travel half a round of a golf course when the discharge per course for the particular golf course is less than 20 Ah. The mapping data in FIG. 6 shows only the characteristics in the brand-new condition and in two stages of deteriorated conditions of the driving battery 21; however, in the case of other deteriorated conditions, the IV curves of three different deterioration levels "A", "B" and "C" which are in fully charged condition, are associated with the 10% IV curves "a", "b", and "c" respectively, and linear interpolation is performed to create the appropriate IV curve. Then, the aforementioned process is carried out based on the data obtained by the interpolation.

As described above, the electric golf cart 10 according to an embodiment having certain features, aspects and advantages of the present invention creates mapping data in advance to define the relationship between the travel distance of the electric golf cart 10 for the day and the number of rounds the electric golf cart 10 travels around a particular golf course, which can be stored in memory. Calculation can be performed to obtain the number of rounds the electric golf cart 10 has traveled based on map data and the travel distance of the electric golf cart 10. Then, the number of rounds and the discharge from the driving battery 21 are used to calculate the discharge per course. In this way, the discharge of the driving battery 21 per round travel of the electric golf cart 16 can be obtained with high accuracy according to the actual operating conditions of the electric golf cart 10. In addition, since the discharge per course for the driving battery 21 is calculated by way of mapping data, special equipment for determining the end of the one round travel is not necessary but could be used in less desirable alternative configurations.

The error of the discharge-per-course value is reduced, because the average of the 50 calculated values is used to obtain the discharge per course. Further, the remaining battery capacity LED 23 is provided to indicate information generally equivalent to the number of rounds that the electric golf cart 10 can still travel. This allows easy acknowledgement of the remaining capacity of the driving battery 21, and the number of rounds to go without the battery recharge. This reduces the likelihood of the electric golf cart 10 stalling in the middle of a golf course or losing the capability to travel further. Moreover, the battery deterioration determining unit 37 is provided to allow checking of the deteriorating condition of the driving battery 21; thus, the usage of the electric golf cart 10 can be adjusted to the battery's deteriorating condition.

The battery capacity management device according to the present invention is not limited to the aforementioned embodiment, but can be altered for implementation as deemed appropriate. For instance, the driving battery 21 can be composed of a lead acid battery in the aforementioned embodiment, but another secondary cell, such as a nickel-cadmium battery, a nickel hydride battery, or a lithium-ion battery can be used as the driving battery 21.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Furthermore, where values specified above are not modified by a term such as "about" or "approximately," Applicant intends that these modifiers still may be used unless otherwise explicitly stated otherwise. Thus, any numeric values set forth above should be consider to be approximate and not specific unless otherwise specified or apparent from their use in context. Accordingly, the scope of the present invention is intended to be defined only by the claims that follow.

What is claimed is:

1. An electric golf cart arranged to be powered by a motor supplied with electric power from a battery, the electric golf cart comprising:
    a travel distance calculator arranged to calculate a travel distance over which the electric golf cart has traveled;
    a memory arranged to store pre-generated mapping data defining a relationship between the travel distance of the electric golf cart and a number of rounds of golf on a golf course that the electric golf cart has traveled;
    a discharge calculator arranged to calculate a battery discharge;
    a discharge-per-unit-round calculator arranged to calculate a discharge-per-round of the battery based on the battery discharge obtained by the discharge calculator and the number of rounds of golf on the golf course the electric golf cart has traveled, the number of rounds of golf on the golf course the electric golf cart has traveled being calculated based on the travel distance obtained by the travel distance calculator and the pre-generated mapping data;
    a maximum battery capacity calculator arranged to calculate a maximum battery capacity of the battery based on the battery discharge calculated by the discharge calculator and a current-voltage characteristic mapping data of the battery; and
    a remaining battery capacity calculator arranged to calculate a remaining battery capacity of the battery based on the maximum battery capacity and to calculate the number of rounds of golf on the golf course that the electric golf cart can travel with the remaining battery capacity of the battery based on the remaining battery capacity and the discharge-per-round of the battery calculated by the discharge-per-unit-round calculator; wherein
    the maximum battery capacity is updated and stored in the memory when the remaining battery capacity reaches a predetermined threshold value.

2. The electric golf cart according to claim 1, further comprising:
    a notifying system arranged to calculate, using the discharge calculator, a discharge over a period from a state in which the battery was charged to the maximum battery capacity to another state in which the remaining battery capacity of the battery reaches the predetermined threshold; wherein
    the notifying system makes a notification when the calculated discharge becomes equal to or less than a discharge required for the electric golf cart to travel through a given number of rounds of golf on the golf course.

3. The electric golf cart according to claim 1, wherein the discharge-per-round is an average over a predetermined number of rounds of golf on the golf course of the discharge-per-round calculated by the discharge-per-unit-round calculator.

4. The electric golf cart according to claim 3, further comprising:
    a notifying system arranged to calculate, using the discharge calculator, a discharge over a period from a state in which the battery was charged to the maximum battery capacity to another state in which the remaining battery capacity of the battery reaches the predetermined threshold; wherein
    the notifying system makes a notification when the calculated discharge becomes equal to or less than a discharge required for the electric golf cart to travel through a given number of rounds of golf on the golf course.

* * * * *